UNITED STATES PATENT OFFICE

Patented Feb. 21, 1950

2,497,920

2,497,920
PLASTICIZING AGENTS

Willard H. Woodstock, Flossmoor, Ill., assignor to Victor Chemical Works, a corporation of Illinois No Drawing. Application January 26, 1946, Serial No. 643,772

8 Claims. (Cl. 106—177)

This invention relates to alkyl alkenylphosphonates, and more particularly to plasticizing compositions including dialkyl alkenylphosphonates in which the alkyl group contains from four to eight carbon atoms.

The method of producing such compositions is disclosed in my copending application, Serial No. 590,956, filed April 28, 1945, now U. S. Patent No. 2,471,472. This application is a continuation in part thereof.

While the method is described in more detail in the said application, the esters are produced by first forming an addition product of an olefine and $PCl_3$, and reacting that compound with $P_2O_5$ to produce a phosphorus oxydichloride which is then esterified. For example, dioctyl styryl-1-phosphonate ester may be prepared by first forming styryl-1-phosphorus oxydichloride and reacting it with an excess of anhydrous 2-ethylhexanol (octyl alcohol) at a temperature below 30° C.

Dioctyl styrylphosphonate has a very low evaporation rate of 0.0011 gram per sq. cm. of surface in 100 hours at 100° C. It may be assumed that 0.10 gram is as high an evaporation as is permissible for plasticizing use of such compounds. Alkyl alkenylphosphonates having the following formula

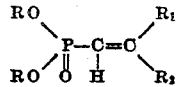

where R is an alkyl group of 4 to 8 carbon atoms, $R_1$ is hydrogen or alkyl, and $R_2$ represents an alkyl or aryl group, and the total number of carbon atoms in the compound is more than 14 and not more than 24 are satisfactory for use as plasticizers.

The following table shows some of the properties of some typical compounds within the formula:

| Compound | Boiling Point, °C. | Freezing Point, °C. | Evaporation Rate, g./sq. cm. | Water Solubility, g./liter |
|---|---|---|---|---|
| Di-n-butyl styryl-phosphonate | 200–5 (3 mm.) | Glassy at −76 | 0.100 | 0.0196 |
| Di-i-amyl styryl-phosphonate | 200–12 (4 mm.) | Glassy at −73 | 0.005 | 0.0161 |
| Dioctyl styryl-phosphonate | 238–40 (3 mm.) | Glassy at −79 | 0.0011 | 0.0169 |
| Dioctyl i-butenyl-phosphonate | 180–5 (3 mm.) | Semi-solid at −80 | 0.032 | 0.0150 |
| Di-i-amyl i-octenyl phosphonate | 168–73 (4 mm.) | Very viscous at −80 | 0.037 | 0.0140 |
| Dioctyl i-octenyl-phosphonate | 214 (4 mm.) | Semi-solid at −80 | 0.0078 | 0.0345 |

The above phosphonates are compatible with ethyl cellulose, nitrocellulose, cellulose acetate, and vinyl chloride polymer resins, and are excellent plasticizers for these resins in amounts from 20% to 40% by weight of the plasticized product, except that the octyl esters are not compatible with cellulose acetate.

The term "a vinyl chloride polymer" as used in the claims is intended to mean a resin containing at least 80% vinyl chloride and from zero to 20% vinyl acetate.

The following table shows plasticizing tests made with the above-named resins prepared by mixing the resins with the plasticizers specified, dissolving them in a suitable solvent and casting them into a thin coating or film and evaporating off the solvent. The films thus produced were strong, clear, and flexible. They showed no tendency toward separation of the plasticizer, and except for the nitrocellulose containing films, all showed improved flame resistance.

| Resin | Plasticizer | Per Cent of Plastic | Solvent | Volatility (5 hrs. at 105° C.) |
|---|---|---|---|---|
| Copolymer of 95% vinyl chloride, 5% vinyl acetate. | Dioctyl styryl-phosphonate | 26 | Methyl ethyl ketone | 1% of plasticizer. |
| | Dioctyl i-octenyl-phosphonate | 26 | do | 8% of plasticizer. |
| | Dibutyl styryl-phosphonate | 26 | do | 13% of plasticizer. |
| | Dioctyl i-butenyl-phosphonate | 26 | do | 39% of plasticizer. |
| | Dibutyl i-butenyl-phosphonate | 26 | do | 45% of plasticizer. |
| | Dibutyl i-octenyl-phosphonate | 26 | do | 59% of plasticizer. |
| Nitrocellulose | Dioctyl styryl-phosphonate | 26 | Methyl ethyl ketone, Butyl acetate, Ethyl alcohol, Toluol.[1] | 1% of plasticizer. |
| | Dibutyl styryl-phosphonate | 26 | do | 11% of plasticizer. |
| | Dioctyl i-octenyl-phosphonate | 26 | do | 12% of plasticizer. |
| | Dibutyl i-butenyl-phosphonate | 26 | do | 38% of plasticizer. |
| | Dioctyl i-butenyl-phosphonate | 26 | do | 38% of plasticizer. |
| | Dibutyl i-octenyl-phosphonate | 26 | do | 50% of plasticizer. |
| Ethyl cellulose | Dioctyl styryl-phosphonate | 20 | Toluol and ethyl alcohol.[2] | 4% of plasticizer. |
| | Dioctyl i-octenyl-phosphonate | 20 | do | 16% of plasticizer. |
| | Dibutyl styryl-phosphonate | 20 | do | 18% of plasticizer. |
| | Dibutyl i-octenyl-phosphonate | 20 | do | 23% of plasticizer. |
| | Dibutyl i-butenyl-phosphonate | 20 | do | 30% of plasticizer. |
| | Dioctyl i-butenyl-phosphonate | 20 | do | 31% of plasticizer. |
| Cellulose acetate | Dibutyl styryl-phosphonate | 43 | Acetone | 17% of plasticizer. |
| | Dibutyl i-butenyl-phosphonate | 43 | do | 45% of plasticizer. |
| | Dibutyl i-octenyl-phosphonate | 43 | do | 51% of plasticizer. |
| | Octyl esters | | Not compatible | |

[1] Mixed solvent: 20% methyl ethyl ketone, 20% butyl acetate, 30% ethyl alcohol, and 30% toluol (by weight).
[2] Mixed solvent: 80% toluol and 20% ethyl alcohol (by weight).

While some of the volatility figures given in the above table appear high, it does not mean that the particular ester is unsatisfactory as a plasticizer. For thick coatings and cast plastic articles the volatility of the plasticizer is of considerably less importance than it is in the thin film. Furthermore the volatility test is intended as a highly accelerated aging indication, and at normal temperatures the plasticizing esters shown above show little or no tendency to vaporize and are highly satisfactory in most commercial plastic applications.

The following table shows additional tests upon certain of the phosphonates:

| Plasticizer | Percent by Wt. | Resin | Percent by Wt. | Percent Elongation | | | Percent loss in 10 days from .004 in. film | | | Heat Stability Hr. at 160° C. | Flex. Temp., °C. | Sweat-out |
|---|---|---|---|---|---|---|---|---|---|---|---|---|
| | | | | 10° C. | 25° C. | 40° C. | Air 60° C. | Water 25° C. | Oil 25° C. | | | |
| Dioctyl styrylphosphonate. | 30 | vinyl chloride polymer.[1] | 70 | 45 | 70 | 125 | 0.1 | −0.9 | 6.7 | 3 | −20.0 | No |
| | 35 | | 65 | 60 | 110 | 170 | 0.2 | −0.4 | 12.0 | 3 | −32.0 | No |
| | 40 | | 60 | 90 | 145 | 220 | 0.4 | −0.5 | 16.5 | 3 | −42.0 | No |
| | 33.5 | | 66.5 | 55 | 100 | 155 | 0.2 | −0.6 | 10.2 | 3 | −28.0 | No |
| Dioctyl i-butenylphosphonate. | 30 | ....do.... | 70 | 65 | 110 | 175 | 9.0 | 1.6 | 15.5 | 5 | −42.0 | No |
| | 35 | | 65 | 95 | 150 | 220 | 7.7 | 1.8 | 20.6 | 4 | −53.0 | No |
| | 40 | | 60 | 140 | 205 | 300 | 8.1 | 1.7 | 26.3 | 4 | −62.0 | No |
| | 28.5 | | 71.5 | 58 | 100 | 167 | 8.3 | 1.6 | 14.0 | 5 | −38.0 | No |
| Dioctyl i-octenylphosphonate. | 30 | ....do.... | 70 | 30 | 60 | 115 | 2.3 | 0.1 | 16.7 | 4 | −36.0 | No |
| | 35 | | 65 | 60 | 95 | 175 | 1.6 | 0.1 | 22.4 | 4 | −43.0 | No |
| | 40 | | 60 | 100 | 155 | 235 | 1.5 | 0.1 | 28.7 | 4 | −53.0 | No |
| | 35.5 | | 64.5 | 63 | 100 | 180 | 1.6 | 0.1 | 22.6 | 4 | −44.0 | No |

Test procedures are described in Ind. Eng. Chem. 35, p. 896 (1943).
[1] vinyl chloride polymer = Copolymer 95% vinyl chloride and 5% vinyl acetate.

The phosphonate esters disclosed herein are disclosed and claimed in my copending application Serial No. 780,591, filed October 17, 1947, which is a continuation-in-part of the present application.

The foregoing detailed description has been given for clearness of understanding only, and no unnecessary limitations should be understood therefrom.

What I claim as new and desire to secure by Letters Patent is:

1. A plasticized material containing 80 to 60% by weight of a member of the class consisting of a vinyl chloride polymer containing from 80 to 100% vinyl chloride and up to 20% vinyl acetate, nitrocellulose, and ethyl cellulose, and approximately 20 to 40% of a compatible phosphonate ester having the formula:

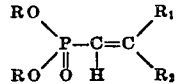

where R is an alkyl group of 4 to 8 carbon atoms, $R_1$ is a member of the class consisting of hydrogen and alkyl groups, $R_2$ is a member of the class consisting of alkyl and aryl groups, the total number of carbon atoms in the compound being more than 14 and not more than 24.

2. A material as set forth in claim 1 containing 60 to 80% by weight of nitrocellulose.
3. A material as set forth in claim 1 containing 60 to 80% by weight of ethyl cellulose.
4. A material as set forth in claim 1 containing 60 to 80% by weight of a vinyl chloride polymer.
5. A nitrocellulose composition containing 20 to 40% by weight of dioctyl styrylphosphonate.
6. A material of the class consisting of a vinyl chloride polymer containing from 80 to 100% vinyl chloride and up to 20% vinyl acetate, nitrocellulose, and ethyl cellulose, and 20 to 40% by weight of dioctyl styrylphosphonate.
7. A material of the class consisting of a vinyl chloride polymer containing from 80 to 100% vinyl chloride and up to 20% vinyl acetate, nitrocellulose, and ethyl cellulose, and 20 to 40% by weight of dioctyl iso-octenylphosphonate.
8. A material consisting of a vinyl chloride polymer containing from 80 to 100% vinyl chloride and up to 20% vinyl acetate, and 20 to 40% by weight of dioctyl styrylphosphonate.

WILLARD H. WOODSTOCK.

REFERENCES CITED

The following references are of record in the file of this patent:

UNITED STATES PATENTS

| Number | Name | Date |
|---|---|---|
| 2,365,466 | Hamilton | Dec. 19, 1944 |
| 2,385,879 | Patton | Oct. 2, 1945 |

OTHER REFERENCES

Chemical Industries, vol. 55 (October 1944), pages 580 and 581.